US009620778B2

(12) United States Patent
Levy et al.

(10) Patent No.: US 9,620,778 B2
(45) Date of Patent: Apr. 11, 2017

(54) METHOD FOR PRODUCING A FUSED PRODUCT

(75) Inventors: Caroline Levy, Paris (FR); Arnaud Apheceixborde, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 106 days.

(21) Appl. No.: 14/233,954

(22) PCT Filed: Jul. 16, 2012

(86) PCT No.: PCT/IB2012/053634
§ 371 (c)(1),
(2), (4) Date: Feb. 20, 2014

(87) PCT Pub. No.: WO2013/011452
PCT Pub. Date: Jan. 24, 2013

(65) Prior Publication Data
US 2014/0158933 A1  Jun. 12, 2014

(30) Foreign Application Priority Data

Jul. 21, 2011  (FR) ...................... 11 56634

(51) Int. Cl.
H01M 4/58 (2010.01)
C01B 25/45 (2006.01)
C01B 25/37 (2006.01)
C03C 10/00 (2006.01)
H01M 10/0525 (2010.01)

(52) U.S. Cl.
CPC ........... H01M 4/5825 (2013.01); C03C 10/00 (2013.01); H01M 4/58 (2013.01); H01M 10/0525 (2013.01)

(58) Field of Classification Search
CPC ....... C01B 25/37; C01B 25/45; H01M 4/5825
See application file for complete search history.

(56) References Cited

U.S. PATENT DOCUMENTS

| | | | |
|---|---|---|---|
| 3,993,119 A | 11/1976 | Scott | |
| 5,674,645 A * | 10/1997 | Amatucci | C01G 45/1242 423/464 |
| 6,153,333 A * | 11/2000 | Barker | H01M 4/582 429/218.1 |
| 6,387,568 B1 * | 5/2002 | Barker | C01B 25/455 429/218.1 |
| 6,514,640 B1 * | 2/2003 | Armand | H01M 4/5825 429/218.1 |
| 8,042,358 B2 * | 10/2011 | Schweiger | C03C 10/0027 65/33.1 |
| 2002/0039687 A1 * | 4/2002 | Barker | H01M 4/131 429/231.95 |
| 2004/0202937 A1 * | 10/2004 | Barker | H01M 4/485 429/231.95 |
| 2005/0026041 A1 | 2/2005 | Jouanneau et al. | |
| 2009/0155689 A1 * | 6/2009 | Zaghib | H01M 4/364 429/221 |
| 2010/0086461 A1 * | 4/2010 | Chung | H01M 4/5825 423/306 |
| 2010/0183924 A1 * | 7/2010 | Song | C01B 25/45 429/221 |
| 2011/0049443 A1 * | 3/2011 | Hibst | C01B 25/45 252/519.4 |
| 2012/0007021 A1 | 1/2012 | Beppu | |
| 2012/0267566 A1 | 10/2012 | Nagakane et al. | |
| 2012/0288763 A1 * | 11/2012 | Ohira | H01M 4/131 429/221 |
| 2013/0224595 A1 * | 8/2013 | Nuspl | H01M 4/5825 429/220 |
| 2013/0260246 A1 * | 10/2013 | Chen | H01M 4/133 429/221 |

(Continued)

FOREIGN PATENT DOCUMENTS

EP  1 325 525  4/2002
EP  1 325 526  4/2002

(Continued)

OTHER PUBLICATIONS

Gauthier et al; "Melt Casting LiFePO$_4$;" Journal of the Electrochemical Society; 2010; vol. 157; No. 4; pp. A453-A462.
Nagamine et al; "Lithium ion conductive glass-ceramics with Li$_3$Fe$_2$(PO$_4$)$_3$ and YAG laser-induced local crystallization in lithium iron phosphate glasses;" Solid State Ionics; 2008; vol. 179; pp. 508-515.
Mar. 20, 2012 Preliminary Search Report issued in French Patent Application No. 1156634 (with translation).
Mar. 20, 2012 Written Opinion issued in French Patent Application No. 1156634 (with translation).
Nov. 15, 2012 Search Report issued in International Patent Application No. PCT/IB2012/053634 (with translation).

(Continued)

Primary Examiner — Liam J Heincer
(74) Attorney, Agent, or Firm — Oliff PLC

(57) ABSTRACT

A method for manufacturing a molten material (the crystallized portion of which consists of a single crystalline phase), includes a) mixing raw materials so as to form a feedstock; b) melting the feedstock until a liquid mass reaches a temperature higher than the melting temperature Tf of the molten material obtained at the end of step e); c) cooling until the liquid mass is completely solidified to obtain a molten material, the amorphous phase of which is constitutes less than 80 wt % thereof; d) optionally crushing/grinding and/or performing selection by particle size on the molten material; e) optionally, heat-treating the molten material at a temperature which is an increment lower than the melting temperature of the molten material and is between Tf−800° C. (or 500° C.) and Tf−50° C., for a period of time in a reducing environment; and f) optionally, crushing/grinding and/or performing selection by particle size on said molten material.

59 Claims, 1 Drawing Sheet

(56) References Cited

U.S. PATENT DOCUMENTS

| | | | | |
|---|---|---|---|---|
| 2013/0323597 A1* | 12/2013 | Levy | ............... | C01G 45/1242 |
| | | | | 429/221 |
| 2015/0210546 A1* | 7/2015 | Song | ............... | B01J 19/24 |
| | | | | 252/182.1 |
| 2015/0255794 A1* | 9/2015 | Choi | ............... | H01M 4/366 |
| | | | | 429/221 |
| 2015/0270543 A1* | 9/2015 | Harada | ............... | H01M 4/485 |
| | | | | 429/92 |

FOREIGN PATENT DOCUMENTS

| | | |
|---|---|---|
| EP | 2 270 904 A2 | 1/2011 |
| EP | 2 295 385 A1 | 3/2011 |
| JP | 2006-155941 A | 6/2006 |
| JP | 2011-001242 A | 1/2011 |
| WO | WO 03/036742 A2 | 5/2003 |
| WO | WO 2005/062404 A1 | 7/2005 |
| WO | 2006/057146 A2 | 6/2006 |
| WO | WO 2010/114104 A1 | 10/2010 |
| WO | WO 2011/049034 A1 | 4/2011 |

OTHER PUBLICATIONS

Nov. 15, 2012 Written Opinion issued in International Patent Application No. PCT/IB2012/053634 (with translation).

Mar. 16, 2016 Office Action issued in Japanese Patent Application No. 2014-520763 (with English-language concise explanation of relevance).

\* cited by examiner

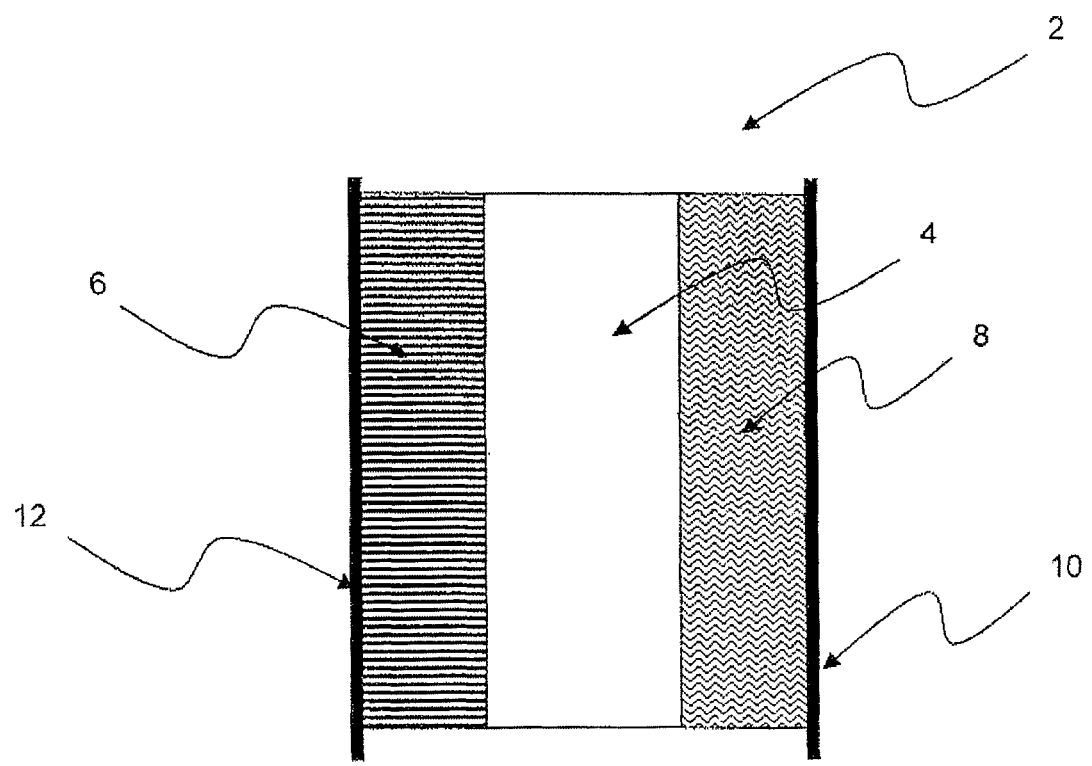

METHOD FOR PRODUCING A FUSED PRODUCT

FIELD OF TECHNOLOGY

The invention relates to a lithium-based fused product, and a method for producing said product. This product can notably be used as electrode material, notably in a lithium-ion battery.

The invention also relates to such a battery.

PRIOR ART

A family of crystalline phases of formula $(Li_{1-a}A_a)_{1+x}(G_{1-b}J_b)_y[(XO_4)_{1-d}D_d]_zE_e$ is known, in which:

Li is the element lithium,

A is a substituent of lithium selected from the elements Na, K, H and mixtures thereof, a being less than or equal to 0.2 (degree of substitution less than or equal to 20 at %), G is selected from the elements Fe, Mn, Ni, Co, V and mixtures thereof, J is a substituent of G selected from Nb, Y, Mg, B, Ti, Cu, Cr and mixtures thereof, b being less than or equal to 0.5 (degree of substitution less than or equal to 50 at %), $XO_4$ is an oxoanion in which O denotes the element oxygen and X is selected from the elements P, S, V, Si, Nb, Mo, Al and mixtures thereof, D is selected from the anions $F^-$, $OH^-$, $Cl^-$ and mixtures thereof, d being less than or equal to 0.35 (degree of substitution less than or equal to 35 at %), and d can be zero, E is selected from the element F, the element Cl, the element O, the OH group, and mixtures thereof, $0 \leq e \leq 2$,
$-0.2 \leq x \leq 2$,
$-0.9 \leq y \leq 2$,
$1 \leq z \leq 3$.

The products rich in $(Li_{1-a}A_a)_{1+x}(G_{1-b}J_b)_y[(XO_4)_{1-d}D_d]_zE_e$ phases notably include products obtained by solid-phase sintering or by mild chemistry and fused products.

The products obtained by solid-phase sintering or by mild chemistry can have a very high percentage of $(Li_{1-a}A_a)_{1+x}(G_{1-b}J_b)_y[(XO_4)_{1-d}D_d]_zE_e$ phases relative to the total crystalline phases. However, these products are much more expensive to produce than the fused products.

Fused products are described for example in WO2005/062404 or in the article "Melt casting LiFePO4", Journal of the Electrochemical Society, 157 (4) A453-A462 (2010), M. Gauthier et al. In contrast to sintered products, fused products can be manufactured industrially, at reduced cost, but are less rich in $(Li_{1-a}A_a)_{1+x}(G_{1-b}J_b)_y[(XO_4)_{1-d}D_d]_zE_e$ phases.

Fused products can be produced by rapidly cooling a mass of molten liquid so as to create a mainly amorphous structure, and then carrying out a thermal treatment of crystallization. This gives a vitroceramic. Such methods are described in particular in EP 2 295 385, WO 2011/049034 or WO 2010/114104. The article *"Lithium ion conductive glass-ceramics semi mix with $Li_3Fe_2(PO_4)_3$ and YAG laser-induced local crystallization in lithium phosphate ion glasses"* by Nagamine et al., Solid State Ionics 179 (2008) 508-515 describes the possibility of drawing patterns of crystals by means of laser technology.

According to these methods, quenching typically leads to a product consisting, to more than 90 wt %, of amorphous phase.

Moreover, lithium is a natural flux, which sublimes if the melting point is too high. For producing these fused products, the melting point is therefore determined conventionally as being as close as possible to the melting point of the raw materials of the starting charge.

Lithium-ion batteries, which are manufactured in large quantities, can incorporate products rich in $(Li_{1-a}A_a)_{1+x}(G_{1-b}J_b)_y[(XO_4)_{1-d}D_d]_zE_e$ phases, notably for manufacturing cathodes thereof. Their performance as well as their service lives depend, among other things, on the richness in $(Li_{1-a}A_a)_{1+x}(G_{1-b}J_b)_y[(XO_4)_{1-d}D_d]_zE_e$ phases of the product used.

There is therefore a need for a product rich in $(Li_{1-a}A_a)_{1+x}(G_{1-b}J_b)_y[(XO_4)_{1-d}D_d]_zE_e$ phases, suitable as electrode material and that can be manufactured in industrial quantities and at reduced cost.

One aim of the invention is to meet this need, at least partially.

SUMMARY OF THE INVENTION

According to the invention, this aim is achieved by means of a product whose crystalline part consists, to more than 99.3 wt %, of one and the same phase $(Li_{1-a}A_a)_{1+x}(G_{1-b}J_b)_y[(XO_4)_{1-d}D_d]_zE_e$, called "LAGJXODE phase" (in the interests of clarity). This product is remarkable in that it is fused, i.e. it is obtained by fusion and then solidification.

Although the manufacture of fused products having a LAGJXODE phase is well known, the inventors have discovered a method which, surprisingly, makes it possible to produce a fused product very rich in LAGJXODE phase, as will be seen in more detail in the rest of the description.

Advantageously, a product according to the invention can therefore be produced at reduced cost and in industrial quantities.

"Same phase $(Li_{1-a}A_a)_{1+x}(G_{1-b}J_b)_y[(XO_4)_{1-d}D_d]_zE_e$" or "LAGJXODE phase" means a defined crystalline phase of formula $(Li_{1-a}A_a)_{1+x}(G_{1-b}J_b)_y[(XO_4)_{1-d}D_d]_zE_e$, with a, b, d, e, x, y, z, A, G, J, X, D and E fixed. Thus, for example, a product comprising 90% of a first phase $(Li_{1-a}A_a)_{1+x}(G_{1-b}J_b)_y[(XO_4)_{1-d}D_d]_zE_e$, with $a=a_1$, $b=b_1$, $d=d_1$, $e=e_1$, $x=x_1$, $y=y_1$, $z=z_1$, $A=A_1$, $G=G_1$, $J=J_1$, $X=X_1$, $D=D_1$ and $E=E_1$, and 9.5% of a second phase $(Li_{1-a}A_a)_{1+x}(G_{1-b}J_b)_y[(XO_4)_{1-d}D_d]_zE_e$, with $a=a_2$, $b=b_2$, $d=d_2$, $e=e_2$, $x=x_2$, $y=y_2$, $z=z_2$, $A=A_2$, $G=G_2$, $J=J_2$, $X=X_2$, $D=D_2$ and $E=E_2$, such that $a_1 \neq a_2$ and/or $b_1 \neq b_2$ and/or $d_1 \neq d_2$ and/or $e_1 \neq e_2$ and/or $x_1 \neq x_2$ and/or $y_1 \neq y_2$ and/or $z_1 \neq z_2$ and/or $A_1 \neq A_2$ and/or $G_1 \neq G_2$ and/or $J_1 \neq J_2$ and/or $X_1 \neq X_2$ and/or $D_1 \neq D_2$ and/or $E_1 \neq E_2$, does not conform to the present invention.

Preferably, a product according to the invention further comprises one, and preferably several, of the following optional characteristics:

a<0.15, preferably a<0.1, preferably a<0.05. In one embodiment, a=0 (no substitution of the lithium); especially when A is the element hydrogen H, preferably a>0.05;

G is selected from Fe, Co, Mn, V and mixtures thereof, preferably from Fe, Co, Mn and mixtures thereof;

G is Fe;

b<0.40, preferably b<0.35, preferably b<0.30, preferably b<0.25, or even b<0.20, or even b<0.15; in one embodiment, b>0.05, or even b>0.1;

the substituent element J is selected from Nb, Y, Mg, B, Ti and mixtures thereof;

X is selected from P, S, Si and mixtures thereof;
preferably, X is the element P;
d<0.30, or even d<0.25, or even d<0.20, or even d<0.15, or even d<0.10, or even d<0.05. In one embodiment, d=0;
D is $F^-$;
E is the element F (fluorine);
x≥−0.1, preferably x≥−0.05, or even x≥0 and/or x≤1.5, preferably x≤1.3, preferably x≤1.2, preferably x≤1;
in one embodiment, x=0;
in one embodiment, y=2;
in one embodiment, y≤1.5;
in one embodiment, y=1;
in one embodiment, y≥1;
in one embodiment, e=2;
in one embodiment, e≤1.5, or even e≤1;
in one embodiment e=1;
in one embodiment e=0;
in one embodiment z=1;
the crystalline part consists, to more than 99.5%, preferably more than 99.7%, preferably more than 99.8%, preferably more than 99.9%, preferably approximately 100 wt %, of said LAGJXODE phase,
the LAGJXODE phase is $LiFePO_4$, or $Li_3V_2(PO_4)_3$, or $LiMnPO_4$, or $Li_2FeSiO_4$, or $LiVPO_4F$, or $LiCoPO_4$, or $LiMn_{0.8}Fe_{0.2}PO_4$, or $LiFe_{0.33}Mn_{0.67}PO_4$, or $LiFePO_4F$, or $LiFeSO_4F$, or $Li_2CoPO_4F$, or $LiVPO_4$;
the product is an annealed product, i.e. has undergone a thermal treatment after solidification;
preferably, the product is not coated with a layer of carbon; in one embodiment, the product is in the form of a powder of particles and more than 50%, preferably more than 70%, preferably more than 90%, preferably more than 95%, preferably more than 99%, preferably approximately 100% by number, of the particles are not coated, even partially, with carbon;
the product is polycrystalline;
the amount by weight of amorphous phase is less than 80%, less than 70%, less than 60%, less than 50%, less than 40%, less than 30%, less than 20%, less than 10%, less than 5%, less than 3%, less than 2%, or less than 1%, based on the weight of the fused product;
the amount of LAGJXODE phases in which the iron has a valence greater than or equal to 3, and in particular of phase $Li_3Fe_2(PO_4)_3$, is less than 30%, preferably less than 20%, preferably less than 10%, preferably less than 5%, preferably less than 1%, in percentage by weight.

Advantageously, these optional characteristics improve the electrochemical performance, making the products particularly suitable, after optional grinding, for producing cathodes for lithium-ion batteries.

A product according to the invention can be in the form of a block with all its dimensions preferably greater than 1 mm, preferably greater than 2 mm, preferably greater than 1 cm, preferably greater than 5 cm, more preferably greater than 15 cm. Preferably, a block according to the invention has a weight greater than 200 g.

The invention also relates to a powder of a fused product according to the invention. The median size of the powder is preferably greater than 0.05 μm and/or less than 100 μm.

In a particular embodiment, the median size of the powder is between 0.05 μm and 5 μm, preferably between 0.05 μm and 2 μm, preferably between 0.05 μm and 0.2 μm. In a particular embodiment, the median size of the powder is between 5 μm and 20 μm, preferably between 7 μm and 15 μm.

More than 50%, preferably more than 70%, preferably more than 90%, preferably more than 95%, preferably more than 99%, preferably approximately 100% by number, of the particles can be covered at least partially, preferably completely, with carbon or with a precursor of carbon.

Method

The invention also relates to a first method for producing a fused product according to the invention, comprising the following steps:
a) mixing raw materials so as to form a starting charge,
b) melting the starting charge until a liquid mass is obtained at a temperature $T_{lm}$ greater than the melting point $T_m$ of the fused product obtained at the end of step e) (which can be greater than the temperature strictly necessary for fusion of the starting charge),
c) cooling until there is complete solidification of said liquid mass, so as to obtain a fused product,
d) optionally, crushing and/or grinding and/or granulometric selection of said fused product,
e) thermal treatment of the fused product at a plateau temperature less than the melting point $T_m$ of said fused product and between $T_m$−800° C., or 500° C. if $T_m$−800° C. is less than 500° C., and $T_m$−50° C., for a holding time at the plateau greater than 90 minutes, and in a reducing environment,
f) optionally, crushing and/or grinding and/or granulometric selection of said fused product, the raw materials in step a), and optionally the gaseous environment in step b), being determined in such a way that the crystalline part of said fused product has, to more than 99.3 wt %, one and the same phase $(Li_{1−a}A_a)_{1+x}(G_{1−b}J_b)_y[(XO_4)_{1−d}D_d]E_e$ as defined above.

Preferably and remarkably, in step b), fusion takes place in a neutral environment or one containing oxygen, preferably under air. This facilitates carrying out of the fusion process.

Preferably, in step c), the cooling rate until complete solidification of the liquid mass is less than 1000 K/s, or even less than 800 K/s, or even less than 500 K/s.

The invention also relates to a second method for producing a fused product according to the invention, in which the crystalline part has, to more than 99.3 wt %, one and the same phase $(Li_{1−a}A_a)_{1+x}(Fe_{1−b}J_b)_y[(PO_4)_{1−d}D_d]_z$, said method comprising the following steps:
a') mixing raw materials so as to form a starting charge,
b') melting the starting charge until a liquid mass is obtained at a temperature $T_{lm}$ greater than the melting point $T_m$ of the fused product obtained at the end of step c'), the temperature $T_{lm}$ being such that:
if the element Fe is supplied to more than 97% of its weight by $FePO_4,n.H_2O$ with 0≤n≤6, then $T_{lm}$ is greater than 1250° C., and preferably less than 1350° C., or
if the element Fe is supplied to more than 3% of its weight by $Fe_2O_3$, then $T_{lm}$ is greater than 1350° C., and preferably less than 1550° C., or
if the element Fe is supplied to more than 5% of its weight by $Fe_3O_4$, then $T_{lm}$ is greater than 1350° C., and preferably less than 1550° C., or
if the element Fe is supplied to more than 97% of its weight by FeO, then $T_{lm}$ is preferably less than 1100° C., or
if the element Fe is supplied to more than 97% of its weight by a mixture of FeO and of $FePO_4,n.H_2O$ with 0≤n≤6, said mixture comprising more than 3% and less than 97% of FePO$_4$,n.H$_2$O with 0≤n≤6, then T$_{lm}$ is greater than 1250° C., and preferably less than 1350° C., c') cooling until there is complete solidification of said liquid mass, so as to obtain a fused product according to the invention, d') optionally, grinding and/or granulometric selection of said fused product so as to obtain a powder of said fused product, the raw materials in step a'), and optionally the gaseous environment in step b'), being determined in such a way that the crystalline part of said fused product has, to more than 99.3 wt %, one and the same phase $(Li_{1-a}A_a)_{1+x}(Fe_{1-b}J_b)_y[(PO_4)_{1-d}D_d]_z$.

Advantageously, this second method of production makes it possible to produce a fused product comprising less than 30%, preferably less than 20%, preferably less than 10%, preferably less than 5%, preferably less than 1% of $(Li_{1-a}A_a)_{1+x}(Fe_{1-b}J_b)_y[(PO_4)_{1-d}D_d]_z$ phases in which the iron has a valence greater than or equal to 3, and in particular a small amount of $Li_3Fe_2(PO_4)_3$. Advantageously, a low content of phases in which the iron has a valence greater than or equal to 3 improves the electrochemical performance of the battery comprising the fused product according to the invention.

Preferably and remarkably, in step b'), fusion takes place in a neutral environment or one containing oxygen, preferably under air. This facilitates carrying out of the fusion process.

This second method is also remarkable in the sense that it makes it possible to obtain a fused product $(Li_{1-a}A_a)_{1+x}(Fe_{1-b}J_b)_y[(PO_4)_{1-d}D]_z$ according to the invention without a step of thermal treatment after the fusion step (in contrast to the first method of production according to the invention that comprises a step e)).

In one embodiment, in step a) or in step a'), the raw materials can be in the solid and/or liquid state, preferably solid.

In one embodiment, one or more raw materials can be supplied in the form of a gas, notably for supplying the element chlorine Cl or the element fluorine F, in step b) or b').

The methods of the invention can be used for producing particles or blocks. They can be adapted so that the fused product has one or more of the optional characteristics mentioned above.

The invention also relates to a product produced or that can have been produced by a method according to the invention.

The invention also relates to the use of a fused product according to the invention or produced or that can have been produced by a method according to the invention in the production of a cathode for lithium-ion batteries.

The invention finally relates to a cathode for lithium-ion batteries comprising a fused product according to the invention or produced or that can have been produced by a method according to the invention, and a lithium-ion battery comprising such a cathode.

The cathode can be obtained in particular by forming a powder according to the invention.

BRIEF DESCRIPTION OF THE DRAWINGS

Other aims, aspects, properties and advantages of the present invention will become even clearer from the description and examples given below and on examining the appended drawing, in which FIG. 1 shows, in cross section, a part of a battery according to the invention.

DEFINITIONS

The "proportion of LAGJXODE phase" is the percentage of LAGJXODE phase relative to the total crystalline phases of the product, this total being called "crystalline part". For a LAGJXODE phase under consideration, an ICDD ("International Center for Diffraction Data") data file is used, making it possible to identify the angular domains of the diffraction peaks corresponding to said LAGJXODE. For example, data file ICDD 40-1499 is that of the olivine phase LiFePO$_4$.

The proportion of LAGJXODE phase can be evaluated from the following formula (1):

$$T=100*(A_{LAGJXODE})/(A_{LAGJXODE}+A_{Secondary\ phases}) \quad (1)$$

where $A_{LAGJXODE}$ is the area of the diffraction peak of highest intensity that is not superposed or of its diffraction multiplet of highest intensity that is not superposed, of the LAGJXODE phase, measured on an X-ray diffraction pattern of said product, for example obtained from an instrument of the diffractometer D5000 type from the company BRUKER equipped with a copper DX tube. Acquisition of the diffraction pattern is carried out using this equipment, over an angular domain 2θ between 5° and 80°, with a step of 0.02°, and a counting time of 1 s/step. The sample is rotated about its own axis in order to limit the preferential orientations. The pattern obtained can be processed for example using the EVA software, without deconvolution treatment;

$A_{Secondary\ phases}$ is the sum of the areas of the secondary phases, measured on the same pattern, without deconvolution treatment. The area of a secondary phase is that of its diffraction peak of highest intensity that is not superposed or of its diffraction multiplet of highest intensity that is not superposed. The secondary phases are the phases detectable by X-ray diffraction other than the LAGJXODE phase. Among others, $Fe_2O_3$, $FePO_4$, $Li_3PO_4$, $AlPO_4$ or $Li_3Fe_2(PO_4)_3$ can be secondary phases identified on the X-ray diffraction pattern, especially when LAGJXODE is LiFePO$_4$. A diffraction peak "not superposed" is a diffraction peak corresponding to a single phase (no superposition of two peaks corresponding to two different phases). Moreover, a diffraction multiplet "not superposed" is a diffraction multiplet corresponding to a single phase.

The precision of such a measurement is equal to 0.3% absolute.

A product is conventionally called "fused" when it is obtained by a method employing fusion of raw materials until a liquid mass is obtained (which can contain solid particles, but in an insufficient amount for structuring said liquid mass, so that the latter must be held in a container to preserve its shape), and then solidification by cooling.

"Particle" means a solid object whose size is less than 10 mm, preferably between 0.01 μm and 5 mm.

"Size" of a particle means the diameter of the sphere with the same volume. The size of the particles of a powder is evaluated conventionally by characterization of the granulometric distribution carried out with a laser granulometer. The laser granulometer can be, for example, a Partica LE-950 from the company HORIBA.

The 50 ($D_{50}$) and 99.5 ($D_{99.5}$) percentiles are the particle sizes corresponding to the percentages, by weight, of 50% and 99.5% respectively, on the curve of cumulative granulometric distribution of the particle sizes of the powder, the particle sizes being classified by increasing order. For example, 99.5%, by weight, of the particles of the powder have a size less than $D_{99.5}$ and 0.5% of the particles by weight have a size greater than $D_{99.5}$. The percentiles can be determined from a granulometric distribution obtained using a laser granulometer.

"Maximum size of a powder" is the 99.5 percentile ($D_{99.5}$) of said powder.

"Median size of a powder" is the 50 percentile ($D_{50}$) of said powder.

"Block" means a solid object that is not a particle.

"Impurities" means the unavoidable constituents, introduced unintentionally and necessarily with the raw materials or resulting from reactions with these constituents. The impurities are not necessary constituents, but are only tolerated. For example, compounds forming part of the group of oxides, nitrides, oxynitrides, carbides, oxycarbides, carbonitrides and metallic species of sodium and other alkali metals, chromium, yttrium, magnesium, boron, copper, and niobium are impurities if their presence is unwanted, i.e. they are not included in the composition of the LAGJXODE product to be produced.

"Precursor of carbon" is a compound which, by thermal treatment, in particular by pyrolysis, is transformed, at least partly, into carbon. An organic polymer, such as polyethylene glycol or PEG, is an example of a precursor of carbon.

Unless stated otherwise, all the contents are percentages by weight.

"Containing a", "comprising a" or "having a" mean "comprising at least one", unless stated otherwise.

DETAILED DESCRIPTION

An example of the first method according to the invention is now described in detail.

In step a), a starting charge for producing a fused product according to the invention is formed from the constituents lithium, A, G, J, D, X and E, or from compounds of these constituents, notably for compounds of oxides and/or of carbonates and/or of hydroxides and/or of oxalates and/or of nitrates and/or of phosphates and/or of metals and/or of chlorides and/or of fluorides and/or of sulfides and/or of ammonia compounds. Preferably, these compounds are selected from the phosphates, the carbonates and the oxides. These compounds can preferably be selected from $Li_2O$, $Li_2CO_3$, $LiOH$, $LiH_2PO_4$, $Li_3PO_4$, $LiF$, $Na_2CO_3$, $NaOH$, $KOH$, $Fe$, $Fe_2O_3$, $Fe_3O_4$, $FeO$, $FePO_4,n.H_2O$ with $0 \leq n \leq 6$, $Co_3O_4$, $CoO$, $V_2O_5$, $Nb_2O_5$, $Y_2O_3$, $B_2O_3$, $TiO_2$, $Cu_2O$, $CuO$, $Cr_2O_3$, $NH_4H_2PO_4$, $(NH_4)_2HPO_4$, $H_3PO_4$, $P_2O_5$, $SiO_2$, $Al_2O_3$, $MoO$, $MnO$, $Mn_2O_3$, $MnO_2$, $Mn_3O_4$, $MgO$, $MgCO_3$, $NiO$. Preferably, these compounds are selected from $Li_2O$, $Li_2CO_3$, $Li_3PO_4$, $Na_2CO_3$, $Fe_2O_3$, $Fe_3O_4$, $FeO$, $FePO_4$, $n.H_2O$ with $0 \leq n \leq 6$, $Co_3O_4$, $CoO$, $V_2O_4$, $Nb_2O_5$, $Y_2O_3$, $B_2O_3$, $TiO_2$, $Cu_2O$, $CuO$, $Cr_2O_3$, $NH_4H_2PO_4$, $(NH_4)_2HPO_4$, $H_3PO_4$, $P_2O_5$, $SiO_2$, $Al_2O_3$, $MoO$, $MnO$, $Mn_2O_3$, $MnO_2$, $Mn_3O_4$, $MgO$, $MgCO_3$, $NiO$.

In one embodiment, the element F is supplied in the form of a gas.

In one embodiment, the element Cl is supplied in the form of a gas.

Preferably, the compounds of the constituents lithium, A, G, J, D, X and E represent together more than 90%, more than 95%, more than 98%, preferably more than 99%, in percentages by weight, of the constituents of the starting charge. Preferably these compounds represent, together with the impurities, 100% of the constituents of the starting charge.

Preferably, no compound other than those supplying the constituents lithium, A, G, J, D, X and E is introduced deliberately in the starting charge, the other constituents present thus being impurities.

The constituents lithium A, G, J, D, X and E of the starting charge are essentially present in the fused product produced. A proportion of these constituents, for example manganese and/or lithium, variable depending on the fusion conditions, may however evaporate during the fusion step. A person skilled in the art knows how to adapt the composition of the starting charge accordingly, so as to obtain, at the end of step e), a fused product according to the invention.

In one embodiment, the starting charge comprises less than 10%, less than 5%, less than 1%, or even no oxide(s) of silicon and/or of aluminum and/or of niobium and/or of boron and/or of germanium and/or of gallium and/or of antimony and/or of bismuth. These elements may however be present in the starting charge in a form other than an oxide.

The granulometries of the powders used can be those commonly encountered in the fusion techniques.

An intimate mixture of the raw materials can be produced in a mixer. This mixture is then poured into a melting furnace.

In step b), the starting charge is melted until a liquid mass is obtained, at a temperature $T_{lm}$ greater than the melting point $T_m$ of the fused product obtained at the end of step e), preferably in an arc furnace. Electric melting in fact makes it possible to produce large amounts of fused product at high yields.

It is possible for example to use an arc furnace of the Héroult type comprising two electrodes, and with a tank with a diameter of about 0.8 m, which can contain about 180 kg of molten liquid.

However, all the known furnaces are conceivable, such as an induction furnace, a plasma furnace or other types of Héroult furnace, provided that they allow the starting charge to be melted completely.

In particular, for a fused $LiFePO_4$ product, power between 400 and 1200 kWh/T is very suitable.

Crucible melting can also be carried out in a heat treatment furnace, preferably in an electric furnace, preferably in a neutral or reducing environment.

An arc furnace or an induction furnace is preferably used.

Without this always being applicable, it is possible to increase the quality of mixing by bubbling with a neutral gas as mentioned in FR 1 208 577. The quality of mixing of the molten liquid can in particular be improved by bubbling with nitrogen. The flow rate and/or the temperature of said gas is preferably adjusted so that the temperature of the liquid mass is not affected much by this addition of gas.

The inventors found that, surprisingly, in the first method according to the invention, the environment in the fusion step b) has little influence on the fused product obtained at the end of step e). It is therefore possible to carry out the fusion step b) in a neutral or oxidizing environment, preferably under air. The carrying out of the method is advantageously simplified thereby.

Preferably, when G is not the element Fe, heating is carried out in such a way that the temperature of the molten liquid mass $T_{lm}$ is less than $T_m+300°$ C., preferably less than $T_m+150°$ C., and/or greater than $T_m+20°$ C., preferably greater than ve $T_m+50°$ C.

At the end of step b), the starting charge is in the form of a liquid mass, which can optionally contain some solid particles, but in an insufficient amount to produce structuring of said mass. By definition, to preserve its shape, a liquid mass must be held in a container.

In a first embodiment, step c) comprises the following operations:
 $c_1$) dispersion of the liquid mass in the form of liquid droplets,
 $c_2$) solidification of these liquid droplets by contact with a fluid, preferably an oxygen-containing fluid, preferably under air, so as to obtain fused particles.

By simple adaptation of the composition of the starting charge, conventional methods of dispersion, in particular by blowing or spraying, thus make it possible to produce, from a molten liquid mass, particles of various sizes in a fused product according to the invention.

In operation $c_1$), a fine stream of the molten liquid is dispersed into liquid droplets. Dispersion can result from blowing through the fine stream of the liquid mass. However, any other method of atomization of a liquid mass, known by a person skilled in the art, is conceivable.

In operation $c_1$), said liquid mass is brought into contact with a fluid, preferably a neutral fluid or an oxygen-containing fluid, preferably an oxygen-containing fluid, preferably a fluid having at least 20 vol % of oxygen, preferably gaseous, more preferably with air.

In operation $c_2$), the liquid droplets are transformed into solid particles by contact with a fluid, preferably a neutral fluid or an oxygen-containing fluid, preferably an oxygen-containing fluid, preferably a fluid having at least 20 vol % of oxygen, preferably gaseous, more preferably with air.

Preferably, the fluid employed is the same for both operations $c_1$) and $c_2$).

Preferably, the method is arranged so that as soon as it is formed, the droplet of molten liquid is in contact with the fluid. More preferably, dispersion (operation $c_1$)) and solidification (operation $c_2$)) are roughly simultaneous, the liquid mass being dispersed by a fluid, preferably a gas, that is able to cool and solidify said liquid.

Preferably, contact with the fluid is maintained at least until complete solidification of the droplets.

Blowing with air at room temperature is possible.

At the end of operation $c_2$), solid particles are preferably obtained that have a size between 0.01 μm and 5 mm, or even between 0.01 μm and 3 mm, depending on the dispersion conditions.

At the end of step $c_2$), the fused product according to the invention can be in the form of particles smaller than 50 μm. Grinding of said particles can then be optional, for manufacture of a cathode.

In a second embodiment, step c) comprises the following operations:
 $c_1$') pouring of the liquid mass into a mold;
 $c_2$') cooling to solidify the liquid mass poured in the mold until a block is obtained that is at least partly solidified;
 $c_3$') removing the block from the mold.

In operation $c_1$'), the liquid mass is poured into a mold that is able to withstand the molten liquid mass. It is preferable to use molds made of graphite, of cast iron, or as defined in U.S. Pat. No. 3,993,119. In the case of an induction furnace, the winding is considered to constitute a mold. Casting is preferably carried out under air.

In step $c_2$'), the liquid mass cast in the mold is cooled until an at least partly solidified block is obtained.

The cooling rate of the molten liquid during solidification is always less than 1000 K/s, or even less than 500 K/s, or even less than 100 K/s.

In one embodiment, during solidification, the liquid mass is brought into contact with a neutral fluid or an oxygen-containing fluid, preferably an oxygen-containing fluid, preferably a fluid having at least 20 vol % of oxygen, preferably gaseous, more preferably with air. Generally, said liquid mass and/or block can be brought into contact with said oxygen-containing fluid in operation $c_1$') and/or in operation $c_2$') and/or in operation $c_3$') and/or after operation $c_3$').

This bringing in contact can therefore be carried out once casting takes place. However, it is preferable only to begin this bringing in contact after casting. For practical reasons, bringing in contact with the fluid preferably only begins after mold release.

In step $c_3$'), the block is removed from the mold.

In step d), optional, the fused product, in the form of particles or blocks, is crushed and/or ground. All types of crushers and grinding mills can be used. Preferably, an air jet mill or a ball mill is used.

In one embodiment, the method comprises a step d).

The fused product is preferably ground so as to obtain a powder having a maximum size $D_{99.5}$ less than 100 μm, preferably less than 80 μm, preferably less than 50 μm, preferably less than 30 μm, preferably less than 10 μm, preferably less than 5 μm, preferably less than 1 μm.

The fused product, optionally after grinding, preferably undergoes an operation of granulometric selection depending on the intended applications, for example by sieving.

Whatever embodiment is considered, impurities derived from the raw materials may be present.

In particular, the elements Ba, Sr, Yb, Ce, Ca; and Si, S, Na, K, Nb, Y, B, Ti, Cu, Cr, Mg, Al may be found as impurities, when the LAGJXODE phase is required not to contain these elements.

Preferably, the total content of impurities by weight is less than 2%, preferably less than 1%, preferably less than 0.7%. More preferably,
 Ca<0.2%, preferably Ca<0.1%, and/or
 Al<0.5%, preferably Al<0.3%, preferably <0.2%, if $XO_4$ does not contain aluminum, and/or
 Si<0.2%, preferably Si<0.15%, if $XO_4$ does not contain silicon, and/or
 Na<0.8%, preferably Na<0.6%, preferably Na<0.5%, preferably Na<0.4%, if A does not contain sodium, and/or
 Ti<0.2%, preferably Ti<0.1%, if G does not contain titanium.

In step e), the fused product undergoes a thermal treatment of crystallization, which advantageously makes it possible to reduce the amount of amorphous phase and increase the amount of LAGJXODE phase.

In step e), preferably the plateau temperature of the thermal treatment is greater than $T_m-700°$ C., preferably greater than $T_m-600°$ C., preferably greater than $T_m-530°$ C., preferably greater than $T_m-480°$ C., preferably greater than $T_m-430°$ C., preferably greater than $T_m-380°$ C., preferably greater than $T_m-330°$ C., and/or preferably less than $T_m-80°$ C., preferably less than $T_m-130°$ C., preferably less than $T_m-180°$ C., preferably less than $T_m-230°$ C. For example, for a LiFePO$_4$ fused product, the temperature of the thermal treatment is greater than 500° C., preferably greater than 550° C., preferably greater than 600° C., preferably greater than 650° C., and less than 930° C., preferably less than 900° C., preferably less than 850° C., preferably less than 800° C., preferably less than 750° C.

Preferably, the holding time at the plateau is more than 2 hours and/or less than 24 hours, preferably less than 15 hours, preferably less than 10 hours. A plateau temperature of 700° C. maintained for 5 hours is very suitable.

The reducing environment can be created with a gas stream such as a CO/CO$_2$ mixture or a N$_2$/H$_2$ mixture. However, any method making it possible to generate a reducing environment known from the prior art can be used.

Preferably, the particles are annealed in a reducing environment created with a gas.

In step f), optional, the annealed fused particles can be ground and/or can undergo an operation of granulometric selection depending on the intended applications, for example by sieving, in particular so that the particles obtained constitute a powder having a median size greater than 0.05 µm and/or less than 100 µm.

In a particular embodiment, the median size of the powder is between 0.05 µm and 5 µm, preferably between 0.05 µm and 2 µm, preferably between 0.05 µm and 0.2 µm. In a particular embodiment, the median size of the powder is between 5 µm and 20 µm, preferably between 7 µm and 15 µm.

In a further step, more than 50% by number of the particles of the fused product from the powder obtained at the end of step e) or f) can be coated, at least partially, with carbon or with a precursor of carbon.

In one embodiment, said particles of the fused product coated with carbon or with a precursor of carbon represent more than 70%, more than 90%, more than 95%, more than 99%, approximately 100% by number of the particles of the powder, which advantageously makes it possible to improve their electrical conductivity, and therefore the performance of the battery comprising a cathode formed from said powder.

The deposition of carbon or of precursor of carbon is carried out conventionally by pyrolysis. Other methods can also be used, for example those described in EP 1 325 525 and EP 1 325 526.

An example of the second method according to the invention is now described in detail.

All the characteristics described above for step a) of the first method according to the invention are also applicable to step a').

Almost all the constituents lithium, A, Fe, J, D, P and E of the starting charge are present in the fused product manufactured. A proportion of these constituents, for example manganese and/or lithium, variable depending on the fusion conditions, may however evaporate during the fusion step. A person skilled in the art knows how to adapt the composition of the starting charge accordingly so as to obtain, at the end of step c'), a fused product according to the invention.

In one embodiment, in step a'), preferably more than 99%, preferably substantially 100 wt % of the element Fe is supplied by FePO$_4$,n.H$_2$O with 0≤n≤6.

In one embodiment, in step a'), preferably more than 5%, or even more than 15%, or even more than 25 wt % of the element Fe is supplied by Fe$_2$O$_3$.

In one embodiment, in step a'), preferably more than 99%, preferably substantially 100 wt % of the element Fe is supplied by FeO.

In one embodiment, in step a'), preferably more than 10%, or even more than 15%, or even more than 25 wt % of the element Fe is supplied by Fe$_3$O$_4$.

In step b'), the starting charge is melted until a liquid mass is obtained, at a temperature $T_{lm}$ greater than the melting point $T_m$ of the fused product obtained at the end of step e), the temperature $T_m$ being such that:
  if the element Fe is supplied to more than 97% of its weight by FePO$_4$,n.H$_2$O with 0≤n≤6, then $T_{lm}$ is preferably greater than 1260° C., preferably greater than 1280° C., and/or preferably less than 1330° C., or
  if the element Fe is supplied to more than 3% of its weight by Fe$_2$O$_3$, then $T_{lm}$ is greater than 1400° C., and/or less than 1500° C., or
  if the element Fe is supplied to more than 5% of its weight by Fe$_3$O$_4$, then $T_{lm}$ is greater than 1400° C., and/or less than 1500° C., or
  if the element Fe is supplied to more than 97% of its weight by FeO, then $T_{lm}$ can be less than 1050° C., or
  if the element Fe is supplied to more than 97% of its weight by a mixture of FeO and of FePO$_4$,n.H$_2$O with 0≤n≤6, said mixture comprising more than 3% and less than 97% of FePO$_4$,n.H$_2$O with 0≤n≤6, then $T_{lm}$ is greater than 1260° C., preferably greater than 1280° C., and/or preferably less than 1330° C.

The inventors found that, surprisingly, it is possible, in the conditions described above, to obtain, at the end of step c'), fused products having a proportion of phase $(Li_{1-a}A_a)_{1+x}(Fe_{1-b}J_b)_y[(PO_4)_{1-d}D_d]_z$ greater than 99.3%, without having recourse to a thermal treatment such as that in step e) of the first method according to the invention.

It is nevertheless possible to perform a step of thermal treatment, as defined in step e) of the first method according to the invention after step d') of the second method according to the invention.

As with step b), it is possible for example to use an arc furnace of the Héroult type comprising two electrodes and with a tank with a diameter of about 0.8 m, which can contain about 180 kg of molten liquid. However, all the known furnaces are conceivable, such as an induction furnace, a plasma furnace or other types of Héroult furnace, provided that they make it possible to melt the starting charge completely.

Crucible melting can also be carried out in a heat treatment furnace, preferably in an electric furnace, preferably in a neutral or reducing environment.

An arc furnace or an induction furnace is preferably used.

A power between 400 and 1200 kWh/T is very suitable, notably for a LiFePO$_4$ fused product.

Without this always being applicable, it is possible to increase the quality of mixing by bubbling with a neutral gas as mentioned in FR 1 208 577. The quality of mixing of the molten liquid can in particular be improved by bubbling with nitrogen. The flow rate and/or the temperature of said gas are adjusted so that the temperature of the liquid mass is not affected much by this addition of gas.

The inventors found that, surprisingly, in a second method according to the invention, the environment in the fusion step b') has little influence on the fused product obtained at the end of step c'). This simplifies the carrying out of the method advantageously, and the fusion step b') can be carried out in a neutral or oxidizing environment, preferably under air.

At the end of step b'), the starting charge is in the form of a liquid mass, which can optionally contain some solid particles, but in an insufficient amount to produce structuring of said mass. By definition, to preserve its shape, a liquid mass must be held in a container.

All the characteristics described above for step c) of the first method according to the invention are also applicable to step c').

All the characteristics described above for step d) of the first method according to the invention are also applicable to step d').

The fused products according to the invention can advantageously have various sizes, and the method of production is not limited to the production of submicron powders. It is therefore perfectly suitable for industrial manufacture.

They can be coated with a layer of carbon or with a layer of a precursor of carbon.

In a preferred embodiment, they are not coated with a layer of carbon. Advantageously, this extends the range of possible uses.

The proportion of LAGJXODE phase, and more generally the degree of crystallization, are preferably as high as possible. These proportions can in particular be increased by reducing the cooling rate during solidification.

Moreover, a powder according to the invention can advantageously be used for making a cathode for lithium-ion batteries. For this purpose, the powder according to the invention can be mixed, in a solvent, with binders and powdered carbon black. The mixture obtained is deposited on the surface of the current collector, generally of aluminum, for example by scraping with a blade (or "doctor blade") or by a roll-to-roll technique, to form the cathode. The cathode is then dried and/or hot rolled to evaporate the solvent, obtain good adhesion on the current collector and good contact between the grains of the cathode layer.

FIG. 1 shows a part of a battery 2, consisting of a separator 4, an anode 6, a current collector 12 at the level of the anode, a cathode 8 and a current collector 10 at the level of the cathode, with all these elements immersed in an electrolyte.

A battery is conventionally composed of several parts as described above.

EXAMPLES

The following examples are given for purposes of illustration and do not limit the invention.

The fused products were produced as follows.

The following starting raw materials were first mixed intimately in a mixer:
  powdered lithium carbonate $Li_2CO_3$, of purity greater than 99 wt % and with a median size less than 420 µm;
  powdered $FePO_4,2H_2O$, of purity greater than 99 wt % and with a median size of about 50 nm;
  powdered $MnO_2$, of purity greater than 91 wt % and with a median size of about 45 µm.

For examples 1 to 6, the starting charge, weighing 4 kg, was poured into a melting arc furnace of the Héroult type. It was then fused following melting at a voltage of 120 V, instantaneous power of 48 kW, and power applied approximately equal to 800 kWh/T, in order to fuse the whole starting charge completely and homogeneously. Fusion was carried out under air.

For the product according to example 1, not according to the invention, after fusion of the starting charge, the mass of molten liquid was at a measured temperature $T_{lm}$ of 1200° C. In step c), the liquid mass was then poured so as to form a fine stream.

Blowing with dry compressed air, at room temperature and at a pressure of 8 bar, broke up the fine stream, dispersing the molten liquid into droplets.

Blowing cooled these droplets and solidified them in the form of fused particles. The cooling rate was between 300 K/s and 800 K/s.

Depending on the conditions of blowing, the fused particles can be spherical or nonspherical, hollow or solid. Their size is between 0.005 mm and 5 mm.

For the product according to example 2, produced by the second method according to the invention, in step b'), after fusion of the starting charge, the measured temperature $T_{lm}$ of the molten liquid was 1300° C. The liquid mass was then poured, under air, into cast-iron molds as defined in U.S. Pat. No. 3,993,119, in such a way that the thickness of the casting was equal to 5 mm. The cooling rate was less than 500 K/s.

For example 3, produced by the first method according to the invention, steps a) to c) are identical to those carried out for the product according to example 1 (not according to the invention). In step d), 100 g of the fused product according to example 1 was ground in a vibratory disk mill RS100 marketed by the company Retsch, so as to obtain a powder having a median size equal to 11 µm. In step e), this powder was placed in an alumina box. This box was put in a Nabertherm HT 16/17 electric furnace, and connected to a system for circulation of a gas 96 vol % $N_2$-4 vol % $H_2$, to create a reducing environment in said box during thermal treatment. The powder was heated in this reducing environment for 5 hours at 700° C., the rate of temperature increase being 100° C./h and the rate of temperature decrease being 100° C./h. After cooling, a powder of product according to example 3 was recovered in the box.

For the product according to example 4, produced by the second method according to the invention, in step b'), after fusion of the starting charge, the measured temperature $T_{lm}$ of the molten liquid was 1275° C. In step c'), the liquid mass was then poured so as to form a fine stream. Blowing with dry compressed air, at room temperature and at a pressure of 8 bar, broke up the fine stream and dispersed the molten liquid into droplets. Blowing cooled these droplets and solidified them in the form of fused particles. The cooling rate was between 300 K/s and 800 K/s.

For the products according to examples 5 and 6, produced by the second method according to the invention, in step b'), after fusion of the starting charge, the measured temperature $T_{lm}$ of the molten liquid was 1260° C. and 1320° C., respectively. Step c') is identical to that of the product of example 4.

Chemical analyses and phase determination were carried out on samples, which had, after grinding, a median size less than 40 µm.

Chemical analysis was carried out by X-ray fluorescence and by "Inductively Coupled Plasma" or "ICP" for lithium and the impurities.

The proportion of LAGJXODE phase was determined from X-ray diffraction patterns, acquired with a D5000 diffractometer from the company BRUKER equipped with a copper DX tube.

Using the EVA software (marketed by the company BRUKER) and after subtracting the continuous background (background 0.8), it is possible to measure the area $A_{LAGJXODE}$ (without deconvolution treatment) of the main peak or main multiplet of diffraction of the LAGJXODE and, for each of the secondary phases, the area $A_{ps}$ (without deconvolution treatment) of the peak of highest intensity that is not superposed or the multiplet of highest intensity that is not superposed. The total area $A_{secondary\ phases}$ can then be calculated as the sum of the areas $A_{ps}$. The proportion of LAGJXODE phase is then calculated from formula (1).

Thus, if the LAGJXODE phase is the only phase present in the X-ray diffraction pattern, the proportion of LAGJX-ODE phase is equal to 100%.

The amount by weight of amorphous phase was determined from X-ray diffraction patterns, obtained from an instrument of the D8 Discover diffractometer type from the company BRUKER equipped with a copper DX tube and a 2D, GADDS, counter, also marketed by the company BRUKER, with an incident angle of 7°.

Acquisition of the diffraction patterns is performed using this equipment, over an angular domain 2θ between 14° and 80°, in a window of 19° and with a counting time of 72 s/window. The sample is rotated about its own axis in order to limit the preferential orientations and obtain average data.

The patterns obtained are processed using the EVA software as follows:

The first step consists of removing the baseline from the background noise (or linear processing). This function comprises two adjustment values: "Threshold" and "Curvature". This subtraction is performed with the appropriate value of "Threshold" and without "Curvature". This baseline is subtracted from the pattern obtained initially. The pattern Patt1 is obtained.

The second step consists of modelling a single diffraction peak associated with an amorphous phase, when it is present. The function "Enhanced" of the EVA software can model a single diffraction peak associated with an amorphous phase in the angular domain 2θ between 20° and 30° when an amorphous phase is present. When this is not the case, the software tries to find a mathematical solution toward higher angles 2θ (typically greater than 40°), which indicates that no amorphous phase can be simulated. In this case, the amount by weight of amorphous phase is considered to be zero. When a peak can be simulated in an angular domain 2θ between 20° and 30°, this peak is subtracted from the pattern Patt1 to obtain pattern Patt2.

The third step consists of measuring the areas under the peaks of the patterns Patt1 and Patt2 obtained. This measurement of areas is carried out using the function "Function net area" of the EVA software.

The amount by weight of amorphous phase, expressed as a percentage, is equal to:

100×[1−(area of the peaks of Patt2/area of the peaks of Patt1)]

The products in examples 1 to 6 did not comprise amorphous phase, according to the method described above.

The results obtained are summarized in Tables 1 and 2:

TABLE 1

| Examples | starting charge | | | Temperature of the liquid mass in step b) or b'), $T_{lm}$ (° C.) |
|---|---|---|---|---|
| 1(*) | $Li_2CO_3$: 0.64 kg | $FePO_4$—$2H_2O$: 3.36 kg | — | 1200 |
| 2 | $Li_2CO_3$: 0.64 kg | $FePO_4$—$2H_2O$: 3.36 kg | — | 1300 |
| 4 | $Li_2CO_3$: 0.64 kg | $FePO_4$—$2H_2O$: 3.36 kg | — | 1275 |
| 5 | $Li_2CO_3$: 0.64 kg | $FePO_4$—$2H_2O$: 3.36 kg | — | 1260 |
| 6 | $Li_2CO_3$: 0.63 kg | $FePO_4$—$2H_2O$: 3.21 kg | $MnO_2$: 0.16 kg | 1320 |

(*)not according to the invention

TABLE 2

| | Chemical analysis (percentages by weight) (oxygen constitutes the complement to 100%) | | | | | | | | Proportion of LAGJXODE |
|---|---|---|---|---|---|---|---|---|---|
| Ex. | Li | Fe | P | Mn | Al | Zr | Others | LiAGJXODE phase | phase |
| 1(*) | 4.63 | 32 | 19.1 | 0.2 | <0.1 | <0.1 | <0.1 | $Li_{1.08}Fe_{0.93}PO_4$ | 95.6% |
| 2 | 4.44 | 31.8 | 18.9 | 0.1 | <0.1 | <0.1 | <0.1 | $Li_{1.05}Fe_{0.93}PO_4$ | >99.9% |
| 3 | 4.63 | 32 | 19.1 | 0.2 | <0.1 | <0.1 | <0.1 | $Li_{1.08}Fe_{0.93}PO_4$ | >99.9% |
| 4 | 4.50 | 31.7 | 19.5 | <0.1 | <0.1 | <0.1 | <0.1 | $Li_{1.03}Fe_{0.90}PO_4$ | >99.9% |
| 5 | 4.18 | 33.6 | 16.7 | <0.1 | <0.1 | <0.1 | <0.1 | $Li_{1.12}Fe_{1.11}PO_4$ | >99.9% |
| 6 | 4.20 | 30.4 | 17.2 | 3.30 | <0.1 | <0.1 | <0.1 | $Li_{1.09}Fe_{0.98}Mn_{0.11}PO_4$ | 99.7% |

(*)not according to the invention

These examples demonstrate the effectiveness of the methods according to the invention.

Comparison of the results of the fusions in examples 1 and 2 shows that a fused product having a proportion of $(Li_{1-a}A_a)_{1+x}(G_{1-b}J_b)_y[(XO_4)_{1-d}D_d]_zE_e$ phase greater than 99.3% is not obtained if the element Fe is supplied by $FePO_4,2H_2O$ with a temperature of the liquid mass, $T_{lm}$, equal to 1200° C., and without step e) of thermal treatment. In contrast, the product in example 2, prepared by the second method according to the invention, with the element Fe supplied to approximately 100% of its weight by $FePO_4, 2H_2O$ in step a') and with a temperature of the liquid mass $T_{lm}$ equal to 1300° C. in step b'), has a proportion of $(Li_{1-a}A_a)_{1+x}(G_{1-b}J_b)_y[(XO_4)_{1-d}D_d]_zE_e$ phase greater than 99.9%.

Comparison of the results of the fusions in examples 1 and 4 shows that a product having a proportion of $(Li_{1-a}A_a)_{1+x}(G_{1-b}J_b)_y[(XO_4)_{1-d}D_d]_zE_e$ phase greater than 99.3% is obtained if the element Fe is supplied by $FePO_4,2H_2O$ with a temperature of the liquid mass, $T_{lm}$, equal to 1300° C., and without step e) of thermal treatment, step c) for the product according to example 1 and step c') for the product according to example 4 being identical. The product according to example 4 has a proportion of $(Li_{1-a}A_a)_{1+x}(G_{1-b}J_b)_y[(XO_4)_{1-d}D_d]_zE_e$ phase greater than 99.9%.

Comparison of the products in examples 1 and 3 shows that a product having a proportion of $Li_{1.08}Fe_{0.93}PO_4$ phase greater than 99.9% can be obtained by the first method according to the invention comprising a step of thermal treatment e).

As is now clear, the method according to the invention makes it possible to produce, simply and economically, in industrial quantities, fused products whose crystalline part comprises more than 99.3% of LAGJXODE phase.

The size of these products can be reduced, for example by grinding in the form of powders if use thereof so requires. These products can also be obtained directly in the form of particles.

Of course, the present invention is not limited to the embodiments described, which are supplied as illustrative, nonlimiting examples.

In particular, the products according to the invention are not limited to particular shapes or dimensions.

The invention claimed is:

1. A method for producing a fused product comprising the following steps:
   a) mixing raw materials so as to form a starting charge;
   b) performing step b1) or step b2) to melt the starting charge to obtain a liquid mass;
   c) cooling the liquid mass until there is complete solidification, so as to obtain a fused product in which the amount by weight of an amorphous phase is less than 80%;
   d) optionally, crushing and/or grinding and/or performing granulometric selection of said fused product;
   e) subjecting the fused product to thermal treatment at a plateau temperature less than a melting point $T_m$ of said fused product and between $T_m-800°$ C., or 500° C. if $T_m-800°$ C. is less than 500° C., and $T_m-50°$ C., for a holding time at the plateau temperature greater than 90 minutes, and in a reducing environment, said step e) being optional if step b2) is performed; and
   f) optionally, crushing and/or grinding and/or performing granulometric selection of said fused product;
   wherein:
   said fused product has a crystalline part including more than 99.3 wt % of one and the same crystalline phase of formula $(Li_{1-a}A_a)_{1+x}(G_{1-b}J_b)_y[(XO_4)_{1-d}D_d]_zE_e$ (LAGJXODE phase), in which (i) Li is the element lithium, (ii) A is a substituent of lithium selected from the elements Na, K, and mixtures thereof, (iii) a is less than or equal to 0.2, (iv) G is selected from the elements Fe, Mn, Ni, Co, V, and mixtures thereof, (v) J is a substituent of G selected from Nb, Y, Mg, B, Ti, Cu, Cr, and mixtures thereof, (vi) b is less than or equal to 0.5, (vii) $XO_4$ is an oxoanion in which O denotes the element oxygen and X is selected from the elements P, S, Si, Nb, Mo, and mixtures thereof, (viii) D is selected from the anions $F^-$, $OH^-$, $Cl^-$, and mixtures thereof, (ix) d is less than or equal to 0.35, (x) E is selected from the element F, the element Cl, the OH group, and mixtures thereof, (xi) $0 \leq e \leq 2$, (xii) $-0.2 \leq x \leq 2$, (xiii) $0.9 \leq y \leq 2$, and (xiv) $1 \leq z \leq 3$;
   step b1) includes melting the starting charge until the liquid mass is obtained at a temperature $T_{lm}$ greater than the melting point $T_m$ of the fused product obtained at the end of step e); and
   step b2) includes melting the starting charge in an oxidizing environment until the liquid mass is obtained at a temperature $T_{lm}$ greater than the melting point $T_m$ of the fused product obtained at the end of step c),
   wherein when step b2) is performed:
   the LAGJXODE phase of the fused product is such that e=0, G is Fe and X is P;
   the element Fe is supplied to (i) more than 97% of its weight by $FePO_4(H_2O)_n$ with $0 \leq n \leq 6$, (ii) more than 3% of its weight by $Fe_2O_3$, (iii) more than 5% of its weight by $Fe_3O_4$, or (iv) more than 97% of its weight by a mixture of FeO and of $FePO_4(H_2O)_n$ with $0 \leq n \leq 6$, said mixture comprising less than 97% of $FePO_4(H_2O)_n$ with $0 \leq n \leq 6$; and
   the temperature $T_{lm}$ of step b2) being such that:
   $T_{lm}$ is greater than 1250° C. and less than 1350° C. when the element Fe is supplied to more than 97% of its weight by $FePO_4(H_2O)_n$ with $0 \leq n \leq 6$ or the mixture of FeO and of $FePO_4(H_2O)_n$ with $0 \leq n \leq 6$; or
   $T_{lm}$ is greater than 1350° C. when the element Fe is supplied to more than 3% of its weight by $Fe_2O_3$ or 5% of its weight by $Fe_3O_4$.

2. The method as claimed in claim 1, wherein the holding time at the plateau temperature of step e) is more than 2 hours and less than 24 hours.

3. The method as claimed in claim 2, wherein the holding time at the plateau temperature of step e) is less than 2 hours.

4. The method as claimed in claim 1, wherein step b1) is performed, G is not the element Fe, and the temperature of the liquid mass $T_{lm}$ is less than $T_m+300°$ C.

5. The method as claimed in claim 1, wherein step b1) is performed, G is not the element Fe, and the temperature of the liquid mass $T_{lm}$ is less than $T_m+150°$ C.

6. The method as claimed in claim 1, wherein step b2) is performed such that:
   the element Fe is supplied to more than 99% of its weight by $FePO_4(H_2O)_n$ with $0 \leq n \leq 6$; or
   the element Fe is supplied to more than 5% of its weight by $Fe_2O_3$; or
   the element Fe is supplied to more than 10% of its weight by $Fe_3O_4$.

7. The method as claimed in claim 6, wherein step b2) is performed such that:
   the element Fe is supplied to more than 100% of its weight by $FePO_4(H_2O)_n$ with $0 \leq n \leq 6$; or
   the element Fe is supplied to more than 15% of its weight by $Fe_2O_3$; or
   the element Fe is supplied to more than 25% of its weight by $Fe_3O_4$.

8. The method as claimed in claim 1, wherein step b2) is performed such that:
   $T_{lm}$ is greater than 1260° C., and less than 1330° C., when the element Fe is supplied to more than 97% of its weight by $FePO_4(H_2O)_n$ with $0 \leq n \leq 6$; or
   $T_{lm}$ is greater than 1400° C., and less than 1500° C., when the element Fe is supplied to more than 3% of its weight by $Fe_2O_3$; or
   $T_{lm}$ is greater than 1400° C., and less than 1500° C., when the element Fe is supplied to more than 5% of its weight by $Fe_3O_4$; or
   $T_{lm}$ is greater than 1260° C., and less than 1330° C., when the element Fe is supplied to more than 97% of its weight by the mixture of FeO and $FePO_4(H_2O)_n$ with $0 \leq n \leq 6$, said mixture comprising more than 3% and less than 97% of $FePO_4(H_2O)_n$ with $0 \leq n \leq 6$.

9. The method as claimed in claim 1, wherein step b2) is performed without performing step e).

10. The method as claimed in claim 1, wherein step b1) is performed in a neutral environment or one containing oxygen.

11. The method as claimed in claim 10, wherein step b1) is performed under air.

12. The method as claimed in claim 11, wherein, in the cooling step c), the cooling rate is less than 1000 K/s.

13. The method as claimed in claim 12, wherein, in the cooling step c), the cooling rate is less than 500 K/s.

14. The method as claimed in claim 1, wherein a<0.15.

15. The method as claimed in claim 14, wherein a<0.1.

16. The method as claimed in claim 15, wherein a=0.

17. The method as claimed in claim 1, wherein G is selected from Fe, Co, Mn, V, and mixtures thereof.

18. The method as claimed in claim 17, wherein G is selected from Fe, Co, Mn, and mixtures thereof.

19. The method as claimed in claim 18, wherein G is Fe.

20. The method as claimed in claim 1, wherein b<0.40.

21. The method as claimed in claim 20, wherein b<0.15.

22. The method as claimed in claim 1, wherein the substituent element J is selected from Nb, Y, Mg, B, Ti, and mixtures thereof.

23. The method as claimed in claim 1, wherein X is selected from P, S, Si, and mixtures thereof.

24. The method as claimed in claim 23, wherein X is the element P.

25. The method as claimed in claim 1, wherein d<0.30.

26. The method as claimed in claim 25, wherein d<0.10.

27. The method as claimed in claim 26, wherein d=0.

28. The method as claimed in claim 1, wherein D is F.

29. The method as claimed in claim 1, wherein E is the element F.

30. The method as claimed in claim 29, wherein x≥−0.1 and x≤1.3.

31. The method as claimed in claim 30, wherein x≥−0.05 and x≤1.2.

32. The method as claimed in claim 31, wherein x≥0 and x≤1.

33. The method as claimed in claim 1, wherein y=2.

34. The method as claimed in claim 1, wherein y≤1.5.

35. The method as claimed in claim 34, wherein y≥1.

36. The method as claimed in claim 35, wherein y=1.

37. The method as claimed in claim 1, wherein e=2.

38. The method as claimed in claim 1, wherein e≤1.5.

39. The method as claimed in claim 38, wherein e≤1.

40. The method as claimed in claim 39, wherein e=1.

41. The method as claimed in claim 1, wherein e=0.

42. The method as claimed in claim 1, wherein the crystalline part includes more than 99.7 wt % of said LAGJXODE phase.

43. The method as claimed in claim 42, wherein the crystalline part includes more than 99.9 wt % of said LAGJXODE phase.

44. The method as claimed in claim 1, wherein said LAGJXODE phase is selected from the group consisting of $LiFePO_4$, $Li_3V_2(PO_4)_3$, $LiMnPO_4$, $Li_2FeSiO_4$, $LiVPO_4F$, $LiCoPO_4$, $LiMn_{0.8}Fe_{0.2}PO_4$, $LiFe_{0.33}Mn_{0.67}PO_4$, $LiFePO_4F$, $LiFeSO_4F$, $Li_2CoPO_4F$, and $LiVPO_4$.

45. The method as claimed in claim 1, wherein said amount by weight of the amorphous phase is less than 50%, based on the weight of the fused product.

46. The method as claimed in claim 45, wherein the amount by weight of the amorphous phase is less than 30%, based on the weight of the fused product.

47. The method as claimed in claim 46, wherein the amount by weight of the amorphous phase is less than 10%, based on the weight of the fused product.

48. The method as claimed in claim 47, wherein the amount by weight of the amorphous phase is less than 5%, based on the weight of the fused product.

49. The method as claimed in claim 1, wherein in case step b2) is performed, x is −0.2≤x≤1.5 and y is 0.9≤y≤1.5 of the formula $(Li_{1−a}A_a)_{1+x}(G_{1−b}J_b)_y[(XO_4)_{1−d}D_d]_zE_e$ (LAGJXODE phase).

50. The method as claimed in claim 1, wherein step b1) is performed in an oxidizing environment.

51. A method for producing a fused product comprising the following, steps:
    a) mixing raw materials so as to form a starting charge;
    b) melting the starting charge to obtain a liquid mass;
    c) cooling the liquid mass until there is complete solidification, so as to obtain a fused product in which the amount by weight of an amorphous phase is less than 80%;
    d) optionally, crushing and/or grinding and/or performing granulometric selection of said fused product;
    e) subjecting the fused product to thermal treatment at a plateau temperature less than a melting point $T_m$ of said fused product and between $T_m$−800° C., or 500° C. if $T_m$−800° C. is less than 500° C., and $T_m$−50° C., for a holding time at the plateau temperature greater than 90 minutes, and in a reducing environment; and
    f) optionally, crushing and/or grinding and/or performing granulometric selection of said fused product;
    wherein:
    said fused product has a crystalline part including more than 99.3 wt % of one and the same crystalline phase of formula $(Li_{1−a}A_a)_{1+x}(G_{1−b}J_b)_y[(XO_4)_{1−d}D_d]_zE_e$ (LAGJXODE phase), in which (i) Li is the element lithium, (ii) A is a substituent of lithium selected from the elements Na, K, and mixtures thereof, (iii) a is less than or equal to 0.2, (iv) G is Fe, (v) J is a substituent of G selected from Nb, Y, Mg, B, Ti, Cu, Cr, and mixtures thereof, (vi) b is less than or equal to 0.5, (vii) $XO_4$ is an oxoanion in which O denotes the element oxygen and X is the element P, (viii) D is selected from the anions $F^−$, $OH^−$, $Cl^−$, and mixtures thereof, (ix) d is less than or equal to 0.35, (x) E is selected from the element the element F, the element Cl, the OH group, and mixtures thereof, (xi) e=0, (xii) −0.2≤x≤2, (xiii) 0.9≤y≤2, and (xiv) 1≤z≤3; and
    step b) includes melting the starting charge until the liquid mass is obtained at a temperature $T_{lm}$ greater than the melting point $T_m$ of the fused product obtained at the end of step c);
    the element Fe is supplied to (i) more than 97% of its weight by $FePO_4(H_2O)_n$ with 0≤n≤6, (ii) more than 3% of its weight by $Fe_2O_3$, (iii) more than 5% of its weight by $Fe_3O_4$, or (iv) more than 97% of its weigh by a mixture of FeO and of $FePO_4(H_2O)_n$ with 0≤n≤6, said mixture comprising less than 97% of $FePO_4(H_2O)_n$ with 0≤n≤6; and
    the temperature $T_{lm}$ of step b) being such that:
    $T_{lm}$ is greater than 1250° C. and less than 1350° C. when the element Fe is supplied to more than 97% of its weight by $FePO_4(H_2O)_n$ with 0≤n≤6 or the mixture of FeO and of $FePO_4(H_2O)_n$ with 0≤n≤6; or
    $T_{lm}$ is greater than 1350° C. when the element Fe is supplied to more than 3% of its weight by $Fe_2O_3$ or 5% of its weight by $Fe_3O_4$.

52. The method as claimed in claim 51, wherein the temperature of the thermal treatment of step e) is greater than $T_m$−700° C. and less than $T_m$−50° C.

53. The method as claimed in claim 52, wherein the temperature of the thermal treatment of step e) is greater than $T_m$−600° C. and less than $T_m$−80° C.

54. The method as claimed in claim 53, wherein the temperature of the thermal treatment of step e) is greater than $T_m$−530° C. and less than $T_m$−130° C.

55. The method as claimed in claim 54, wherein the temperature of the thermal treatment of step e) is greater than $T_m-480°$ C. and less than $T_m-180°$ C.

56. The method as claimed in claim 55, wherein the temperature of the thermal treatment of step e) is greater than $T_m-430°$ C. and less than $T_m-230°$ C.

57. The method as claimed in claim 56, wherein the temperature of the thermal treatment of step e) is greater than $T_m-380°$ C.

58. The method as claimed in claim 57, wherein the temperature of the thermal treatment of step e) is greater than $T_m-330°$ C.

59. A method for producing a fused product comprising the following steps:
- a) mixing raw materials so as to form a starting charge;
- b) melting the starting charge to obtain a liquid mass;
- c) cooling the liquid mass until there is complete solidification, so as to obtain a fused product in which the amount by weight of an amorphous phase is less than 80%;
- d) optionally, crushing and/or grinding and/or performing granulometric selection of said fused product;
- e) optionally, subjecting the fused product to thermal treatment at a plateau temperature less than a melting point $T_m$ of said fused product and between $T_m-800°$ C., or 500° C. if $T_m-800°$ C. is less than 500° C., and $T_m-50°$ C., for a holding time at the plateau temperature greater than 90 minutes, and in a reducing environment; and
- f) optionally, crushing and/or grinding and/or performing granulometric selection of said fused product;

wherein:

said fused product has a crystalline part including more than 99.3 wt % of one and the same crystalline phase of formula $(Li_{1-a}A_a)_{1+x}(G_{1-b}J_b)_y[(XO_4)_{1-d}D_d]_zE_e$ (LAGJXODE phase), in which (i) Li is the element lithium, (ii) A is a substituent of lithium selected from the elements Na, K, and mixtures thereof, (iii) a is less than or equal to 0.2, (iv) G is the element Fe, (v) J is a substituent of G selected from Nb, Y, Mg, B, Ti, Cu, Cr, and mixtures thereof, (vi) b is less than or equal to 0.5, (vii) $XO_4$ is an oxoanion in which O denotes the element oxygen and X is the element P, (viii) D is selected from the anions $F^-$, $OH^-$, $Cl^-$, and mixtures thereof, (ix) d is less than or equal to 0.35, (x) E is selected from the element F, the element Cl, the OH group, and mixtures thereof, (xi) e=0, (xii) $-0.2 \leq x \leq 2$, (xiii) $0.9 \leq y \leq 2$, and (xiv) $1 \leq z \leq 3$; and step b) includes melting the starting charge until the liquid mass is obtained at a temperature $T_{lm}$ greater than the melting point $T_m$ of the fused product obtained at the end of step c);

the element Fe is supplied to (i) more than 97% of its weight by $FePO_4(H_2O)_n$ with $0 \leq n \leq 6$, (ii) more than 3% of its weight by $Fe_2O_3$, (iii) more than 5% of its weight by $Fe_3O_4$, or (iv) more than 97% of its weight by a mixture of FeO and of $FePO_4(H_2O)_n$ with $0 \leq n \leq 6$, said mixture comprising less than 97% of $FePO_4(H_2O)_n$ with $0 \leq n \leq 6$; and the temperature $T_{lm}$ of step b) being such that:

$T_{lm}$ is greater than 1280° C. when the element Fe is supplied to more than 97% of its weight by $FePO_4(H_2O)_n$ with $0 \leq n \leq 6$; or $T_{lm}$ is greater than 1280° C. when the element Fe is supplied to more than 97% of its weight by the mixture of FeO and $FePO_4(H_2O)_n$ with $0 \leq n \leq 6$, said mixture comprising more than 3% and less than 97% of $FePO_4(H_2O)_n$ with $0 \leq n \leq 6$.

* * * * *